(Model.)
H. BRALEY.
CAR COUPLING.
No. 395,733.　　　　　　　　Patented Jan. 8, 1889.
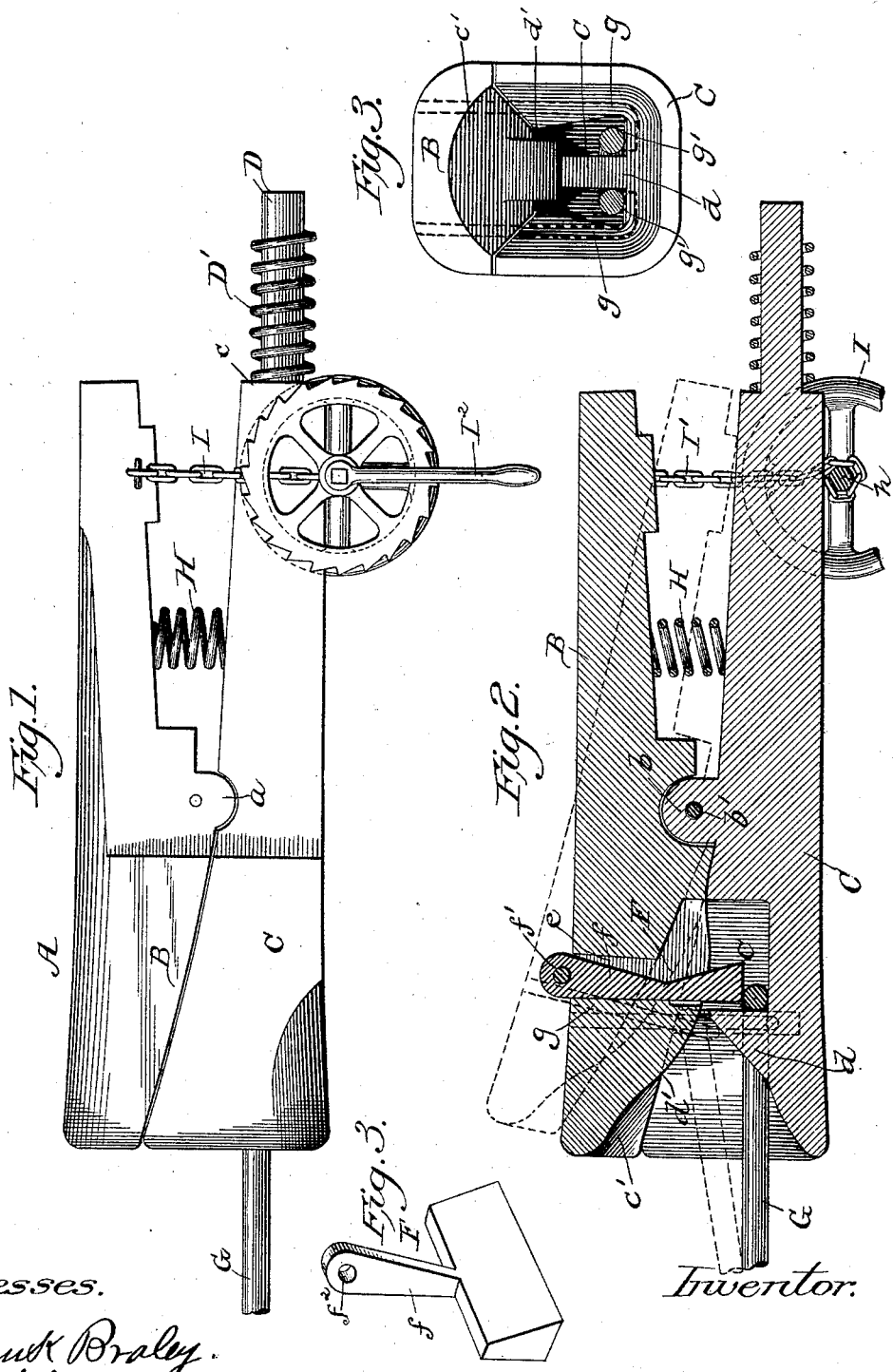
Witnesses.
Frank Braley
Jas. A. Davis
Inventor.
Hartwell Braley

UNITED STATES PATENT OFFICE.

HARTWELL BRALEY, OF LANGSVILLE, OHIO.

CAR-COUPLING.

SPECIFICATION forming part of Letters Patent No. 395,733, dated January 8, 1889.

Application filed July 6, 1888. Serial No. 279,229. (Model.)

*To all whom it may concern:*

Be it known that I, HARTWELL BRALEY, a citizen of Langsville, in the county of Meigs and State of Ohio, have invented certain new and useful Improvements in Car-Couplers; and I do hereby declare the following to be a full, clear, and exact description of the invention, such as will enable others skilled in the art to which it appertains to make and use the same.

My invention relates to an improvement in car-couplings, and has for its object to provide a car-coupling which shall be sure in operation to couple and uncouple cars, and which, when the cars are coupled, shall insure positive connection, and one which will not be liable to permit the accidental separation of the cars.

A further object is to produce a car-coupling which shall be simple in construction, cheap to manufacture, and applicable to cars already in use.

With these objects in view my invention consists in certain novel features of construction and peculiar combinations and arrangements of parts, as will be hereinafter set forth, and pointed out in the claims.

In the accompanying drawings, Figure 1 is a side elevation of my improved car-coupler. Fig. 2 is a longitudinal sectional view of the same. Fig. 3 is an end view of the coupler.

A indicates a draw-head, comprising two sections or jaws, B C. The jaw B is furnished at a point between its ends with a lug, $a$, at each side thereof, adapted to receive between them a lug, $b$, projecting upwardly from the jaw C, a pivot-pin, $b'$, being passed through said lugs, and thus pivotally uniting the jaws B C. The lower jaw, C, is also provided at its inner end with a shank, D, by which the draw-head may be secured to the draft-timbers of the car, a spring, D', being preferably inserted between the draft-timbers and a shoulder, $c$, produced by the shank D.

The forward portion of the lower jaw, C, is provided with a recess, $c$, the extreme forward portion of which is preferably made larger than the inner portion. Projecting upwardly from the lower jaw, C, within the recess $c$ is a lip, $d$, having an inclined front face and a vertical rear face, as shown in Fig. 2. The forward end of the upper jaw, B, is also provided with a recess, $c'$, to coincide with the recessed forward end of the jaw C, a projection, $d'$, extending downwardly from the jaw B to a point in proximity to the lip $d$ when the parts are in their closed positions. In rear of the projection $d'$ a vertical perforation, $e$, is made in the jaw B for the accommodation of the shank $f$ of a weighted pendulous lever, F, said shank projecting above the top surface of the jaw B and being supported by a pin, $f'$, passing through a perfotion, $f^2$, in the shank $f$ and resting on the jaw B. The shank $f$ is preferably inclined on one face, as shown in Figs. 2 and 3, to permit an oscillatory movement of the pendulous lever F, for a purpose hereinafter explained. If desired, the rear side of the shank $f$ may be made straight and the perforation $e$ cut away to permit its oscillation. The lower end of the lever F extends into the recess $c$ of jaw C in rear of the lip $d$, sufficient space being left between said lower end of the lever and the bottom of the recess $c$ to admit a link, G, which encircles the lip $d$, and is held to its seat by the lever F.

The jaws B C of the draw-head are beveled in rear of the pivot $b'$, as shown in Figs. 1 and 2, so that the jaw B may have a free vibratory movement on the jaw C, said jaws being held normally together at their forward ends by means of a spiral spring, H, inserted between the two jaws in rear of their pivotal connection.

Secured to the upper jaw, B, at opposite sides of the projection $d'$ are two downwardly-projecting rods $g$, provided at their lower ends with inwardly-projecting hooks $g'$, adapted to enter beneath the link G at opposite sides of the lip $d$.

Journaled beneath the jaw C, near its rear end, is a wheel, I, to the shaft $h$ of which one end of a chain or rope, I', is secured, the other end of said rope or chain being secured to the jaw B, thus providing means for causing the jaw B to vibrate on its pivot and move away from the jaw C at its forward end. When such separation of the forward ends of the jaws is effected, the hook-shaped rods $g$ will lift the link G so as to clear the lip $d$ of jaw C.

In lieu of the wheel I, a ratchet mechanism may be provided to retain the forward ends of the jaws separated. In such case a handle, I², will preferably be secured to the shaft h.

When the cars are being coupled, the link G will strike the projection d' of jaw B and lip d of jaw C and cause the jaws to separate. The link then forces the pendulous lever rearwardly and drops behind the lip d, when the lever F will fall to its place by gravity and the forward ends of the jaws assume their normal closed positions.

Slight changes might be made in the constructive details of my invention without departing from the spirit thereof; hence I do not wish to restrict myself to the precise details of construction herein described; but, Having fully described my invention, what I claim as new, and desire to secure by Letters Patent, is—

1. In a car-coupler, the combination, with a draw-head comprising two jaws pivoted together and provided with recesses at their forward ends, of projections extending from said jaws into said recesses, substantially as set forth.

2. In a car-coupler, the combination, with a draw-head composed of two jaws pivoted together and recessed at their forward ends, of a projection on one of said jaws having a straight rear face and a spring to maintain the forward portions of the jaws together, substantially as set forth.

3. In a car-coupler, the combination, with a draw-head composed of two jaws pivoted together and recessed at their forward ends, of projections extending from said jaws into the recess and a pendulous lever supported by the upper jaw and extending downwardly in rear of the projection on the lower jaw, substantially as set forth.

4. In a car-coupler, the combination, with a draw-head composed of two jaws pivoted together and recessed at their forward ends and projections extending from said jaws into the recess, of a pendulous lever supported by the upper jaw and extending downwardly in rear of the projections on the jaws and mechanism for vibrating said jaw, substantially as set forth.

5. In a car-coupler, the combination, with a draw-head made in two sections and recessed at their forward ends and projections extending from said jaws into the recesses, of a pendulous lever supported to oscillate in rear of said projections, hooked bars carried by the upper jaw and extending to the bottom of the recess in the lower jaw and mechanism for vibrating the jaws, substantially as set forth.

In testimony whereof I have signed this specification in the presence of two subscribing witnesses.

HARTWELL BRALEY.

Witnesses:
JAMES S. MARSH,
J. A. DAVIS.